(12) United States Patent
Flam et al.

(10) Patent No.: US 7,805,322 B2
(45) Date of Patent: *Sep. 28, 2010

(54) HEALTHCARE ELIGIBILITY AND BENEFITS DATA SYSTEM

(75) Inventors: Seth Flam, San Diego, CA (US); Jonathan Flam, San Diego, CA (US); Sol Lizerbram, Rancho Santa Fe, CA (US)

(73) Assignee: HealthFusion, Inc., Solana Beach, CA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 11/495,098

(22) Filed: Jul. 28, 2006

(65) Prior Publication Data

US 2008/0027760 A1  Jan. 31, 2008

(51) Int. Cl.
*G06Q 40/00* (2006.01)
(52) U.S. Cl. .......................................... 705/4
(58) Field of Classification Search ................... 705/4
See application file for complete search history.

(56) References Cited

U.S. PATENT DOCUMENTS 5,070,452 A * 12/1991 Doyle et al. .................... 705/2
2003/0036926 A1 2/2003 Starkey et al.
2003/0149594 A1 8/2003 Beazley et al.
2004/0172313 A1 9/2004 Stein et al.
2004/0249665 A1 12/2004 David
2005/0015280 A1 1/2005 Gabel et al.
2005/0102170 A1 5/2005 Lefever et al.
2005/0288972 A1 12/2005 Marvin et al.
2006/0047539 A1 * 3/2006 Huang .......................... 705/4
2006/0149603 A1 * 7/2006 Patterson et al. ................ 705/4
2007/0005402 A1 1/2007 Kennedy et al.
2007/0005403 A1 1/2007 Kennedy et al.
2007/0027718 A1 * 2/2007 Amerantes et al. ............. 705/3
2007/0083397 A1 * 4/2007 Bryan ........................... 705/4
2007/0192146 A1 8/2007 Menocal et al.
2007/0239492 A1 10/2007 Sweetland et al.
2007/0239493 A1 10/2007 Sweetland et al.

OTHER PUBLICATIONS

Non-final Office Action received in U.S. Appl. No. 11/494,952, dated Aug. 28, 2009.

* cited by examiner

*Primary Examiner*—Jagdish N Patel
*Assistant Examiner*—Sara Chandler
(74) *Attorney, Agent, or Firm*—Foley & Lardner LLP

(57) ABSTRACT

A healthcare eligibility and benefits system provides efficient processing and exchanging of eligibility and benefits data with clearinghouses and payers, such as insurance companies, federal and state health plans, and the such. Certain data from responses is stored and used by future requests. As such, the system captures member data such that the member data does not have to be keyed in a second time.

25 Claims, 14 Drawing Sheets

| Eligibility | Referral Add | Referral Inquiry | Precert Add | Precert Inquiry | Claim Status | Claim Report |

View Responses | DocFind

Help | Setup | Home | Contact Us | Logoff

△▽ Eligibility

1. Select a Payer:
   Aetna ▽

2. Provider Information:
   Provider ID: 4076583   Select

3. Select Search Criteria:
   HMO Member ID ▽

4. Identify the Member:
   HMO Member ID: [      ] Select

5. Enter Date Information:
   Date of Service: 04/25/2006

6. Select a Service Type:
   Service Type Code: 98 Professional (Physician) Visit - Office ▽
   Or Enter The Code Here: [    ]

Submit Transactions   Reset

| Eligibility | Referral Add | Referral Inquiry | Precert Add | Precert Inquiry | Claim Status | Claim Report |

View Responses | DocFind

Help | Setup | Home | Contact Us | Logoff

▽ ▷ Eligibility

1. Select a Payer:

Aetna ▷

2. Provider Information:

Provider ID: [4076583] [Select]

3. Select Search Criteria:

[HMO Member ID ▷]

4. Identify the Member:

HMO Member ID: [AN935010] [Select]   — 502

5. Enter Date Information:

Date of Service: [04/25/2006]

6. Select a Service Type:

Service Type Code: [98 Professional (Physician) Visit - Office ▷]
   Or Enter The Code Here: [ ]

[Submit Transactions]  [Reset]

Eligibility | Referral Add | Referral Inquiry | Precert Add | Precert Inquiry | Claim Status | Claim Report View Responses | DocFind Help | Setup | Home | Contact Us | Logoff △△ Eligibility

Status = Active

Transaction Overview

| Patient Name | Transaction Type | Status | Date | Time | Transaction Identifier | Member ID |
|---|---|---|---|---|---|---|
| Member Test | Eligibility Inquiry | Active | 04/25/2006 | 5:39 PM | 0176036WEB | AN35010 |

Plan Information

| Plan Name | Plan Number | Group/Policy Description | Group/Policy # | Plan Begin | Plan Ntwk ID | Plan Address |
|---|---|---|---|---|---|---|
| HMO | 0145691 | Dummy Account for Claims | US0099W99001 | 02/01/2002 | MD02 | |

Payer Information

| Payer Name | Payer ID | | | | AHF Payer % | |
|---|---|---|---|---|---|---|
| Aetna | 953402799 | | | | | |

802

Patient Information Provided by Plan

| Subscriber Name | Sub DOB | Sub Gender | Street | City | State | Zip | SSN | Sub Member ID | Ins. Type |
|---|---|---|---|---|---|---|---|---|---|
| Member Test | 04/30/1972 | Male | 123 Bruin Dr | Los Angeles | CA | 90017 | | AN35010 | HMO |

804

Provider Information Provided by Plan

| Submitter Name | Submitter Type | Submitter Prov ID | Service Date | Period Start Date |
|---|---|---|---|---|
| Cohen, Neil | Provider | 4076053 | 04/25/2006 - 04/25/2006 | 09/27/2002 |

Eligibility | Referral Add | Referral Inquiry | Precert Add | Precert Inquiry | Claim Status | Claim Report
View Responses | DocFind
Help | Setup | Home | Contact Us | Logoff △▷ Eligibility 1. Select a Payer:
   [Aetna ▽]

2. Provider Information:
   Provider ID: [4076053] [Select]

3. Select Search Criteria:
   [Non-HMO Member ID + DOB ▽] — 502

4. Identify the Member: [Select]
   Member ID: [AN935010]
   Patient DOB: [04/30/1972]

Enter Search Criteria

Last Name          First Name
   [          ]       [          ]

[Search Members]  [Clear All]

○ | Member ID | Name
     | AN935010  | Member Test

[Add New Member]  [Cancel]        Page: 1 of 1
                                                    ← 600

5. Enter Date Information:
   Date of Service: [04/25/2006]

6. Select a Service Type:
   Service Type Code: [98 Professional (Physician) Visit - Office ▽]
   Or Enter The Code Here: [    ]

[Submit Transactions]  [Reset]

ERA Overview

ERA Email Notification & Secure FTP (mailbox) Delivery - Sign Up

ERA, Payer and Provider Information

*ERA and Payer Information*

Payer: Aetna
Payer Phone: 888-632-3862

EFT Trace/Check#: 1642706001833
EFT Payment/Check Date: 05/02/2006

ERA Date: 01/02/2006
EFT Payment: $197.26

*Provider Information*

Name: Joe Doctor
Tax ID: 932-20-3565

Address: PO Box 2087
City, State, Zip: Wenatchee, WA 98807

Payer Assigned ID: 541544220
Network ID: 0372667-00201NN

Claim, Service/Line Level and Adjustment Information

*Claim Information*

Patient Name: Smith, John F
Patient Account #: 12346578

Patient ID: MEBBP88
Product Type: HMO

Claim ID: 060404E0420701
DRG: $3,272.67

*Service/Line Level and Adjustment Information*

Service/Line Level Information

| DOS | Code | Units | Charges | Adjustments | Co-pay | Deductible | Co-ins | Patient | Ins. Paid |
|---|---|---|---|---|---|---|---|---|---|
| 03/29/06 - 03/29/06 | HC90471 | 0 | $552.08 | $305.42 | $49.32 | $0.00 | $0.00 | $49.32 | $197.26 |
| Totals | | | $552.08 | $305.42 | $49.32 | $0.00 | $0.00 | $49.32 | $197.26 |

Interest
Discount

Payment Amount: $197.26

Adjustment Summary

| Procedure Code | Date | Adjustment Level | Code | Translation | Amount |
|---|---|---|---|---|---|
| HC90471 | 03/29/06 | Service | PR 3 | Patient Responsibility - Copay Amount | $49.32 |
| HC90471 | 03/29/06 | Service | CO 45 | Contractual Obligation - Charges exceed your contracted/legislated fee arrangement | $305.42 |

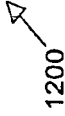

A new ERA arrived with check # xxxx-1883 Message

File  Edit  View  Insert  Format  Tools  Table  Window  Help

To... JoeDoctor@yahoo.com
Cc...
Bcc...
Subject:

A new ERA / ERB has been processed and is available for viewing, printing, or download.

ERA / EOB Information

Payer: Aetna
Payer Phone: 800-624-0756
Provider Name: Joe Doctor MD
EFT/Check Date: 05/05/2006
EFT/Check Amount: $197.26
EFT/Check Number: xxxxx-1883

Powered By HealthFusion Electronic Notification System

You are receiving this email because you completed the sign-up for email notification form on an ERA or EOB website the is powered by HealthFusion software. To unsubscribe to the electronic notifications via email service please log in to the same site that you used to sign up for the service with the same user id and password. After successfully logging in please select the sign up for email notification link and then select the unsubscribe link.

Please do not reply to this email. Contact information is contained in the confidentiality statement below.

FIG. 13

HEALTHCARE ELIGIBILITY AND BENEFITS DATA SYSTEM

CROSS REFERENCE TO RELATED APPLICATIONS

The present application is related to U.S. patent application Ser. No. 11/494,952 entitled "System and Method for Coordination of Benefits in a Healthcare System."

FIELD OF THE INVENTION

The present invention relates generally to healthcare eligibility and benefits data systems.

BACKGROUND

This section is intended to provide a background or context to the invention recited in the claims. The description herein may include concepts that could be pursued or may have been pursued, but are not necessarily ones that have been previously conceived or pursued. Therefore, unless otherwise indicated herein, what is described in this section is not prior art to the description and claims in this application and is not admitted to be prior art by inclusion in this section.

U.S. Patent Application Publication No. 2005/0015280 to Gabel et al. indicates that "[t]he process for health care providers to verify a patient's insurance eligibility and to settle claims is ripe for improvement. Prior to providing care, providers contact payers to verify whether a patient is actually covered under a particular plan, what specific procedures, lab tests, and the like are covered under the plan, and whether dependents are covered. In most present cases, providers either type patient information into a web-based or batch-based system or call voice IVR (interactive voice response) systems to verify a patient's coverage. This process is costly, time consuming, and error prone, often resulting in delayed payment of claims due to eligibility issues." (Para [0002].)

U.S. Patent Application Publication No. 2003/0036926 to Starkey et al. indicates that "If [a medical eligibility] application form is incomplete or if the application form includes inconsistent answers, then there may be a delay in obtaining coverage or coverage may be denied. Some application forms include questions that are designed to verify the patient's answers and to combat fraud. A patient may, without fraudulent intent, answer these questions differently. If so, then the patient's application may be rejected or returned to the patient for an explanation." (Para [0012].)

SUMMARY

According to at least one exemplary embodiment, a healthcare eligibility and benefits data system includes a provider computer configured to receive patient information for a patient and to communicate an eligibility request to a payer computer where the provider computer includes programmed instructions to: obtain certain data from an eligibility response received from the payer computer in response to the eligibility request from the provider computer, store the certain data from the eligibility response for later retrieval, and provide the stored certain data.

Exemplary systems comprise a variety of aspects. The eligibility request can include a completed HIPAA 270 form and the eligibility response can include a completed HIPAA 271 form. The programmed instructions can include code to present a list of patients for whom certain data is stored. The list of patients can be presented in a pop up window. New eligibility requests can be populated with the stored certain data. The programmed instructions can also check the format validity of the eligibility request locally before the eligibility request is communicated.

According to another exemplary embodiment, a method of managing data in an eligibility system can include receiving information corresponding to a candidate for a service, communicating the received information to a payment guarantor to determine eligibility for payment of the service, receiving an eligibility response from the payment guarantor as to the eligibility of the candidate, and storing information from the eligibility response for use later when it is necessary to request eligibility for the candidate.

Exemplary methods comprise a variety of aspects. For example, the eligibility response can include a HIPAA 271 response. The stored information can include a member identifier information. The methods may also verify the received information before the received information is communicated. Further, the methods may provide a list of candidates for whom information is stored and, upon selection of one candidate from the list of candidates, the methods retrieve stored information associated with the selected candidate.

According to an exemplary embodiment, the computer program product includes programmed instructions to obtain certain data from an eligibility response for a patient received from a payer computer in response to an eligibility request, programmed instructions to store the certain data from the eligibility response for later retrieval, and programmed instructions to provide the stored certain data when a new eligibility request is made for the patient.

As used herein, healthcare refers to services offered by the health profession. Healthcare is one example implementation of the exemplary embodiments. Eligibility refers to qualified or entitled to receive. Benefits refers to something that helps or aids. Provider computer refers to a machine used by a service provider, such as a healthcare provider. Payer computer refers to a machine used by a payer company, such as a health insurance company. HIPAA refers to the Health Insurance Portability and Accountability Act of 1996.

These and other features, aspects and advantages of the present invention will become apparent from the following description, appended claims, and the accompanying exemplary embodiments shown in the drawings, which are briefly described below.

BRIEF DESCRIPTION OF DRAWINGS

FIG. 5 is a screen display of a healthcare benefits interface in accordance with an exemplary embodiment.

FIG. 6 is a screen display of the interface of FIG. 5 including a pop up window with a member list in accordance with an exemplary embodiment.

FIG. 7 is a screen display of the interface of FIG. 5 including an entered member ID in the appropriate field in accordance with an exemplary embodiment.

FIG. 8 is a screen display of a response to a request including data regarding a member in accordance with an exemplary embodiment.

FIG. 9 is a screen display of a second request using the interface of FIG. 5 including the pop up window of FIG. 6 in accordance with an exemplary embodiment.

FIG. 10 is a screen display of the second request of FIG. 9 in accordance with an exemplary embodiment.

FIG. 11 is a screen display of an interface having an electronic remittance advice (ERA) notification option in accordance with an exemplary embodiment.

FIG. 12 is a screen display of an ERA interface having provider, payer, and claim information in accordance with an exemplary embodiment.

FIG. 13 is an email notice of ERA activity in accordance with an exemplary embodiment.

DETAILED DESCRIPTION OF EXEMPLARY EMBODIMENTS

Exemplary embodiments will be described below with reference to the accompanying drawings. It should be understood that the following description is intended to describe exemplary embodiments of the invention, and not to limit the invention.

Figure 1:
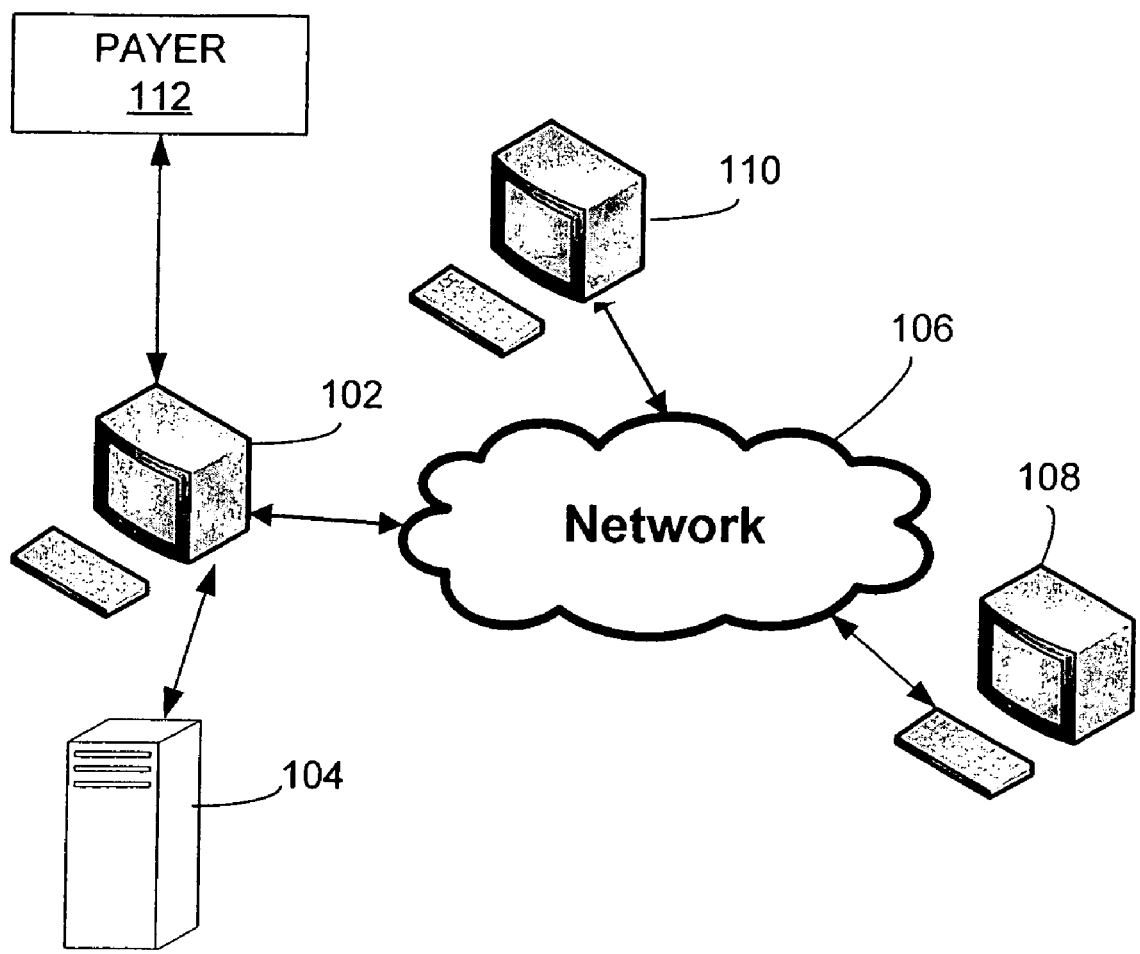
FIG. 1 is a diagram illustrating a healthcare eligibility and benefits data system in accordance with an exemplary embodiment.

FIG. 1 illustrates an exemplary healthcare eligibility and benefits data system 100. The system 100 includes a computer 102 and a database 104. The system 100 is coupled to a network 106 by which the system 100 can communicate with provider systems 108 and 110. In some embodiments, system 100 communicates with provider systems 108 or 110 via non-Internet network connections. The system 100 communicates with a payer system 112 directly or via a network (not shown), which can be a virtual private network (VPN), a secure file transfer protocol (SFTP), a high speed line, an Internet-based network, or a dedicated network.

Providers 108 and 110 submit and receive real-time transactions with system 100. For example, providers 108 and 110 submit claims to the system 100 and download ERA from system 100. The system 100 sends claims and real-time requests to the payer system 112, and the system 100 receives claims, real-time responses, and ERA from the payer system 112. The computer 102 has software including an operation system that provides various system-level operations and provides an environment for executing application software. In this regard, computer 102 is loaded with a software application that provides information for use in communications with provider systems and payer systems.

The Health Insurance Portability and Accountability Act (HIPAA) requires that all health insurance payers in the United States comply with the electronic data interchange (EDI) standards for health care as establish by the Secretary of Health and Human Services (HHS). The ANSI X12N 270/271 implementation guide has been established as the standards of compliance for eligibility transactions. An ANSI 270 transaction set is required to start the inquiry process. Submitters passing syntax and implementation guide editing have responses returned via the ANSI 271 transaction set based on the implementation guide. Submitters not passing syntax and implementation guide editing have responses returned via a TA1 and/or a 997 response. An ANSI 271 transaction set can be used to communicate information about or changes to eligibility, coverage or benefits from information sources (e.g., insurers, sponsors, payors) to information receivers (e.g., physicians, hospitals, repair facilities, third party administrators, governmental agencies). This information includes but is not limited to benefit status, explanation of benefits, coverages, dependent coverage level, effective dates, amounts for co-insurance, co-pays, deductibles, exclusions and limitations.

The system 100 can be a clearinghouse system. Under HIPAA, a clearinghouse serves a specific function—converting non-standard transactions into standard transactions or standard transactions into non-standard transactions (e.g., when a physician mails a paper claim to an intermediary, who converts the non-standard paper claim into an electronic claim meeting the requirements of a standard transaction, for transmission onto a health insurer for purposes of claim payment).

As a HIPAA clearinghouse system, system 100 exchanges ANSI X12 270/271 (eligibility and benefits) data with other clearinghouses and with payers (insurance companies, federal and state health plans etc.). In an exemplary embodiment, the X12 270 requests for eligibility that the system 100 makes are via an HTML interface that is available on the Internet, if the user has the proper log in credentials and a browser that supports 128 bit encryption (for example).

According to an exemplary embodiment, the system 100 has an HTML interface for 270 requests that includes user specific fields requiring completion such that a properly formatted eligibility request can be made to the receiver. When the receiver (e.g., a payer or another clearinghouse) electronically receives the 270 request, it responds with a 271 response to the system 100. In an exemplary embodiment, the system 100 renders the 271 response to an HTML format and displays payer eligibility and benefit information on behalf of the user. The fields required to complete the HTML eligibility request form require several details. Each request must be member specific, meaning that eligibility requests must have member ID information, such as a payer assigned member ID character string (letters and numbers) and sometimes member date of birth information.

In general, the fields that require the user to do the most work to complete are the fields that assist the payer in identifying the member. Typically, this identification information is located on the member's insurance ID card or in the member's chart in the healthcare provider office. Normally at the time a request is needed, the provider must keystroke this data onto the HTML form. In contrast, the system 100 captures data from an NM1 segment of the member loop of the 271 response. For every 270 request made for which there is a corresponding 271 response the member data is stored for automated retrieval at a later point in time. The member data that is stored can include the subscriber first name, subscriber last name, subscriber date of birth and subscriber ID. When the appropriate button is clicked, a pop up display shows a list of members. The pop up display is populated with member data stored in the database. The purpose of the pop up display is to automate the entry of member information on the eligibility request form. Members can be organized by last name and can be searched for by name. Advantageously, instead of always using the member's card or chart to visualize and manually enter member data via the keyboard, the corresponding member ID fields are completed by selecting the appropriate member interface contained in the pop up display. Work to fill the fields is reduced to just a few mouse clicks.

Figure 2:
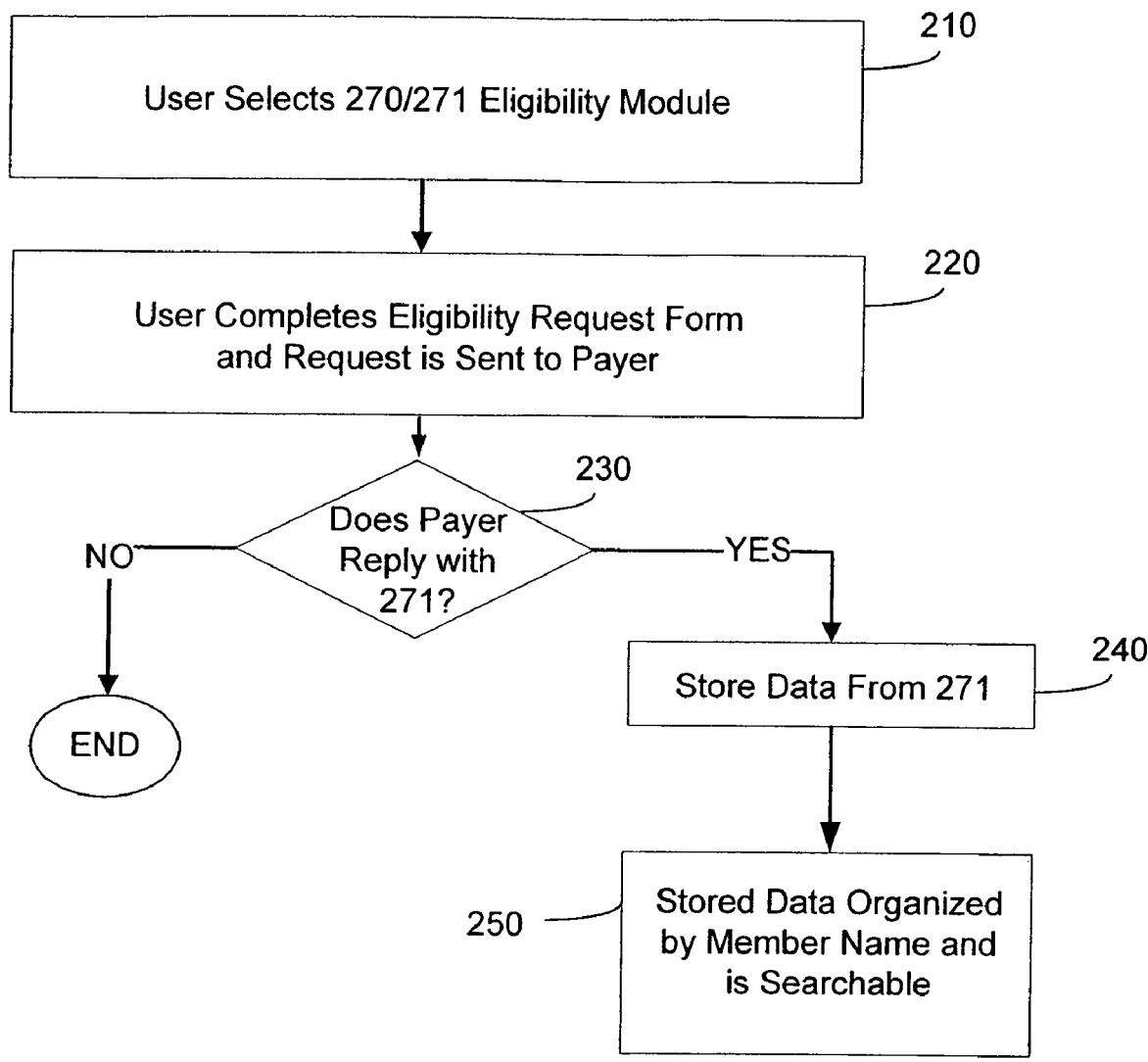
FIG. 2 is a flow diagram depicting operations performed in the healthcare eligibility and benefits data system of FIG. 1 in accordance with an exemplary embodiment.

FIG. 2 illustrates a flow diagram depicting operations performed in the healthcare eligibility and benefits data system.

Additional, fewer, and different operations may be performed depending on the particular implementation. In an operation 210, the user selects the 270/271 eligibility module from a computer selection screen. In an operation 220, the user completes an eligibility request form (e.g. HIPAA 270 form) and the request is sent to the payer. In at least one embodiment, the local computer includes a program which checks the data input by the user to ensure that the data conforms to the valid request requirements of the particular payer. For example, date formats and other particularities of data entry can be checked before the eligibility request is sent.

In an operation 230, a determination is made whether the payer replies with an approved response form (e.g. HIPAA 271 form). If the approval response form is received, some of the data from the response is stored to memory in an operation 240. Such data can include first and last name, date of birth, subscriber ID, etc. This stored data can be used for subsequent eligibility requests when the same member returns at a later date. In an operation 250, this data is organized by member name.

While the operations of FIG. 2 are described in the context of HIPAA eligibility and benefit forms, the operations are equally applicable to other healthcare and non-healthcare management systems. In healthcare embodiments, for example, data about a patient or healthcare plan member is typically entered by someone other than the member.

Figure 3:
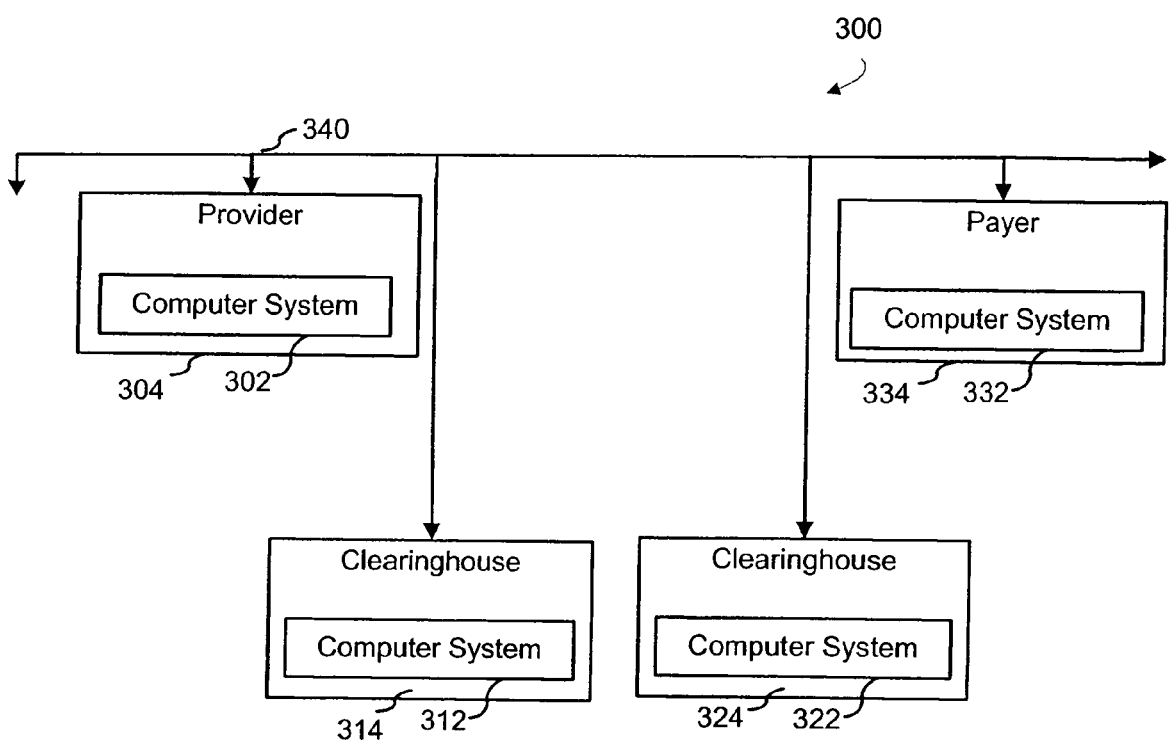
FIG. 3 is a diagram illustrating a computer system configured to administer the healthcare and eligibility benefits data system of FIG. 1 in accordance with an exemplary embodiment.

FIG. 3 illustrates a computer system 300 usable to implement various features described herein is shown. The computer system 300 can include a variety of computer subsystems, including a computer system 302 associated with a purchaser or investor 304, a computer system 312 associated with a clearinghouse 314, a computer system 322 associated with a clearinghouse 324, and a computer system 332 associated with a payer 332. Other computer systems can also be coupled to those systems shown in FIG. 3.

Each of the computer systems 302, 312, 322, and 332 may comprise a single computer including a microprocessor and memory with program logic and stored data to implement the features described herein, or may comprise multiple computers which are connected together, for example, by way of a network (not shown). The computer systems 302, 312, 322, and 332 are coupled by way of a network 340, which is shown to be a single network but which may in practice comprise one or more individual point-to-point connections and/or which may comprise one or more network connections, such as the Internet.

The clearinghouse computer system 322 may execute eligibility and benefits management software. In one configuration, the software executed by the clearinghouse computer system 322 is a web-based interface (e.g., a web browser), and the computer system 322 executes the algorithms that provide the functionality and logic of the eligibility and benefits software. The eligibility and benefits software includes computer code that executes instructions to receive information to be used in obtaining eligibility and benefits information. Such information can include, for example, a member identifier number and a date of birth. The computer system 300 may be used to electronically carry out the transactions described herein, and to conduct other processing/transactions in connection with the eligibility and benefits system.

Figure 4:
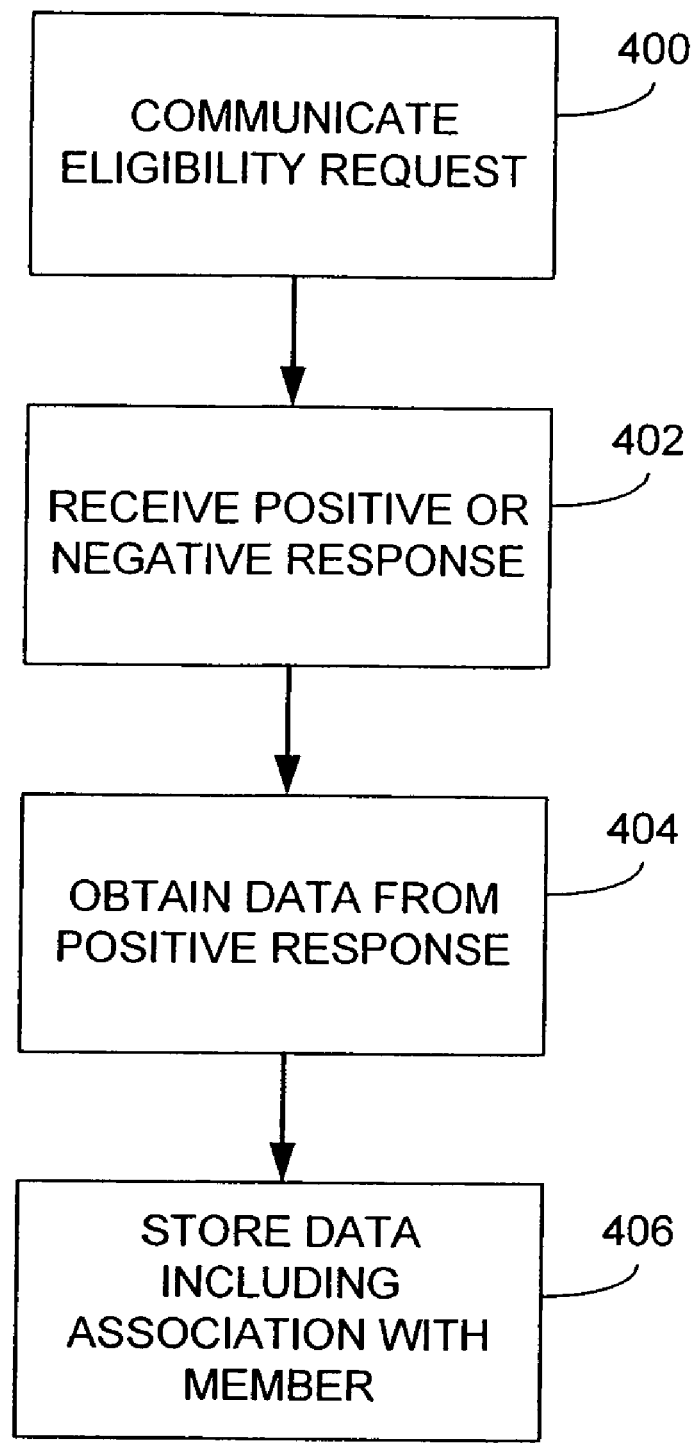
FIG. 4 is a flow diagram depicting operations performed in the healthcare eligibility and benefits data system of FIG. 1 in accordance with an exemplary embodiment.

FIG. 4 illustrates operations performed in the healthcare eligibility and benefits data system in accordance with an exemplary embodiment. Additional, fewer, or different operations may be performed depending on the embodiment or implementation. The operations also may be performed in a different order than that presented. In an operation 400, an eligibility request is communicated. Preferably, this communication is done using a computer coupled to the Internet or some network communication system. The communication is directed to a payer computer.

In an operation 402, the requesting computer receives a positive or a negative response. A positive response indicates that the payer computer found a record corresponding to the person whose eligibility is being requested. A negative response can indicate that no record was found for the person whose eligibility is being requested or, in the alternative, the record was found but the person does not have an active membership with the payer institution. The process of requesting and receiving a response can take less than a minute to receive. Preferably, the process takes ten seconds or less.

In an operation 404, the requesting computer captures data from the positive response that can be used at subsequent visits by the patient for faster processing of the eligibility determination. For example, the membership number or identifier and other personal information can be captured in the format accepted by the payer computer because the information is taken from data sent by the payer computer.

In an operation 406, data captured from the eligibility response is stored in a memory device such as a database. The data is stored in a manner by which it is associated with the particular patient. As such, the data can be quickly retrieved when the patient returns and eligibility needs to be confirmed again. Patient eligibility may change from one visit to the next and it can be costly to the provider if services are performed for patients who are no longer eligible for a particular service. The provider costs can include costs to recover fees from a non-eligible patient as well as costs for non-payment.

Figure 6:
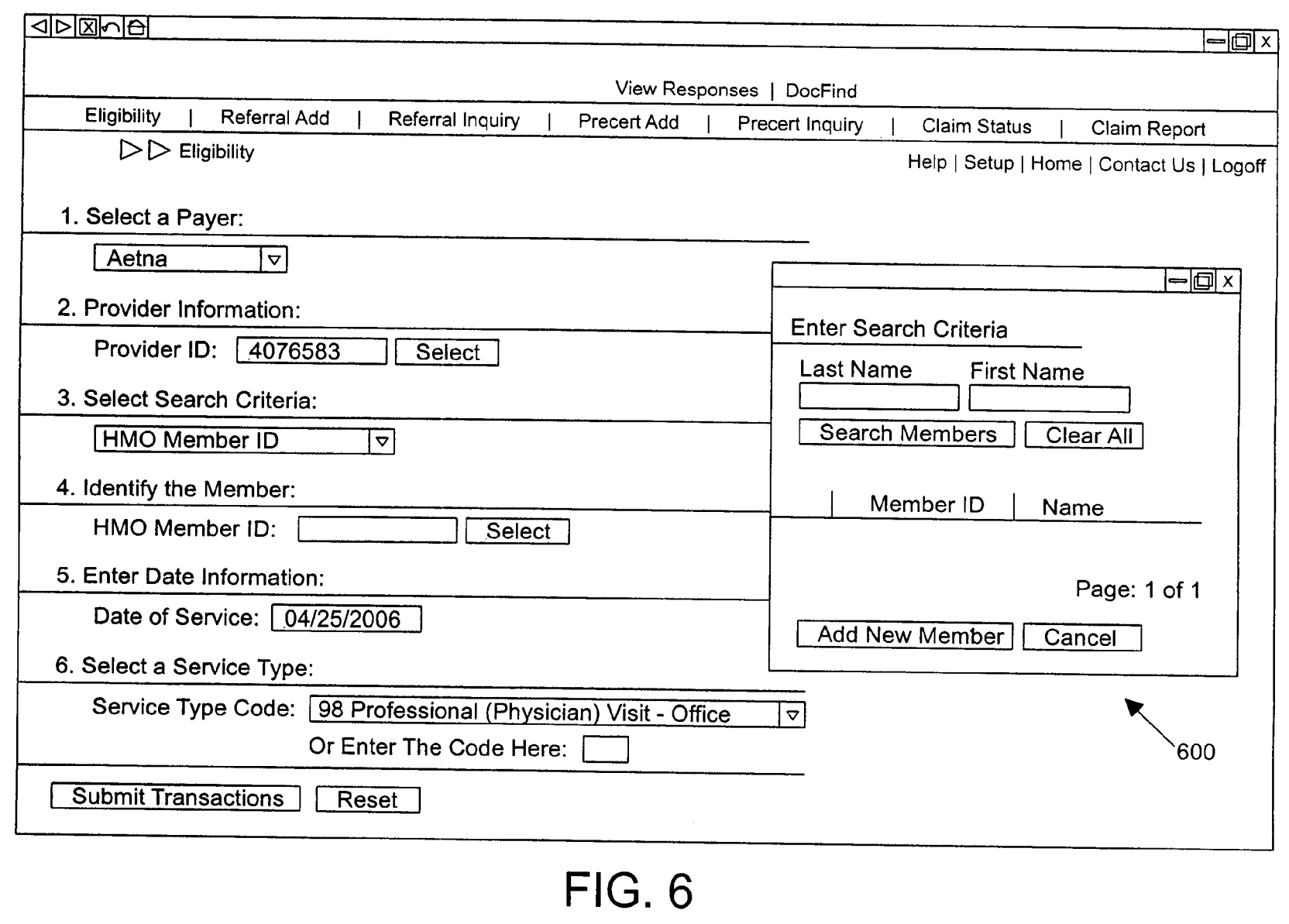

FIG. 5 illustrates a screen display an exemplary healthcare benefits interface 500. Included in the interface 500 is a text box 502 under the label "4. Identify the Member" which is where the HMO (health maintenance organization) member identifier is entered. FIG. 6 illustrates a screen display of the interface 500 including a pop up window 600 including an area for a member list. In the interface 500 of FIG. 6, no members have been stored yet.

FIG. 7 illustrates the interface 500 including an entered member identifier in the text box 502. FIG. 8 illustrates a portion 800 of screen display showing a response to a request including data regarding a member. This response is returned once the request shown in FIGS. 5-7 is communicated to a payer. The payer returns a member identifier in field 802 and date of birth data in field 804. In an exemplary embodiment, the identifier and date of birth data is returned in the NM1 segment of the member loop of the 271 response.

Figure 9:
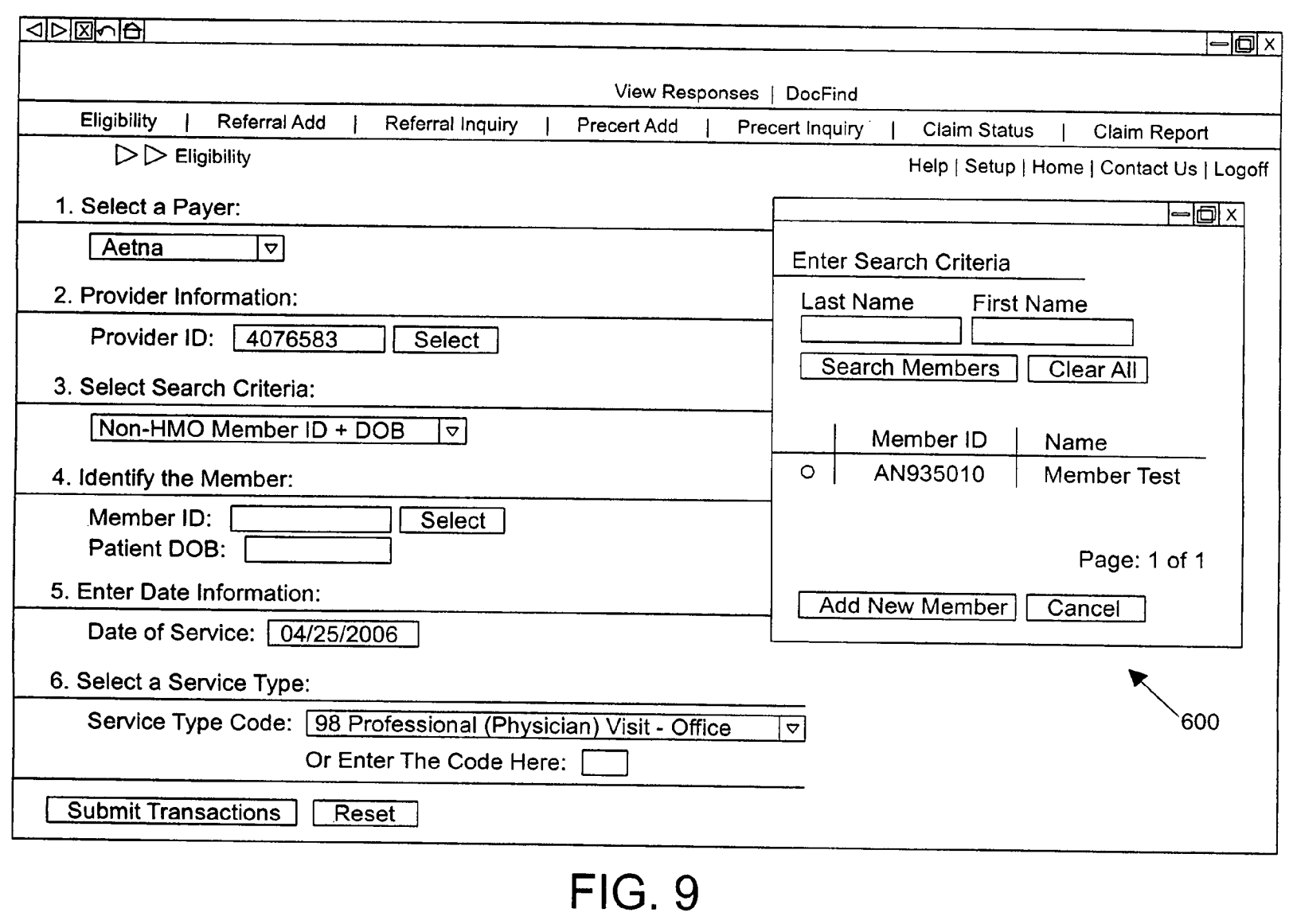

FIG. 9 illustrates the interface 500 when a second request is entered. The pop up window 600 is now populated with data from the previous response described with reference to FIG. 8. FIG. 10 illustrates a screen display showing the interface 500 with member ID and date of birth data populated upon selection by the user of a particular member using the pop up window 600.

Referring again to FIG. 1, provider systems 108 and 110 receive information regarding payment from the payer system 112. In an example scenario, the provider system 108 bills an amount of money for a service that is higher than what the payer allows. Payers can communicate an explanation of benefits (EOB) to provider systems. An EOB shows the amount the provider charged for each code and date submitted by the provider in a claim. The EOB shows how charges are adjusted by the payer. Reasons for adjustment can include provider charged more than agreed to by contract with the payer, a portion of the amount is the responsibility of the patient, etc.

EDI standard 835 is the HIPAA-defined standard for electronic transmission of EOB information. Electronic remittance advice (ERA) can include an Electronic EOB® transaction, which is a registered trademark of HealthFusion, Inc. The format of an electronic EOB is referred to as an electronic remittance advice (ERA). In some situations, 835 data accompanies an Electronic Funds Transfer from the payer. The payer is not required to mail a check and a paper EOB statement by coupling related but separate transactions. Electronic transactions save money for the payer in check processing and mailing fees. Providers also benefit from the efficiencies and security of electronic EOBs. Providers can also upload 835 data and use it to reconcile outstanding patient account balances. In such a situation, the provider does not have to manually post payments from a paper EOB.

Figure 11:
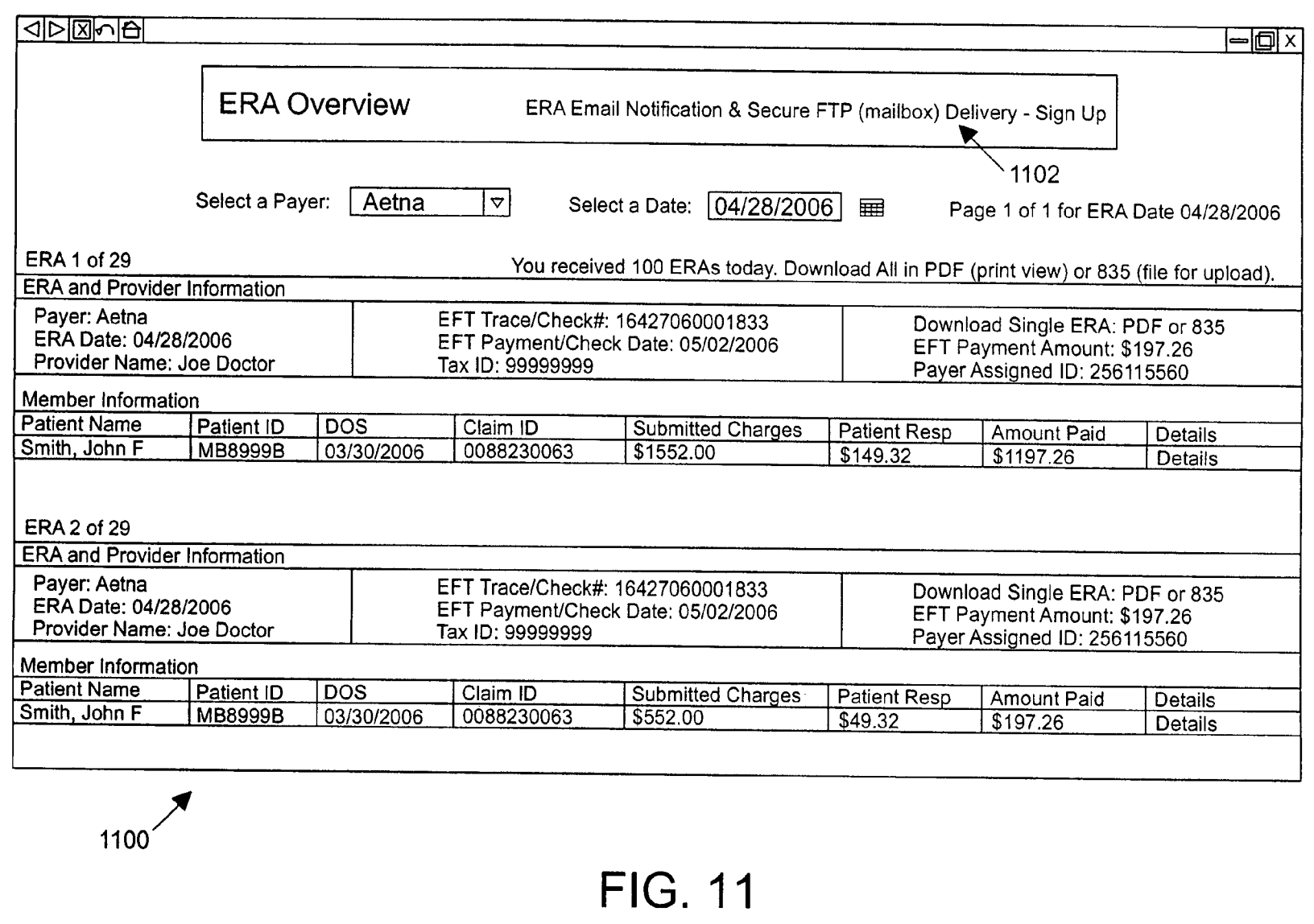

The computer 102 can receive 835 files for many providers in a batch. An 835 file from a single payer may include many individual 835 files. The computer 102 parses payer files available to providers. These provider files can be viewed on a web browser, viewed as a file (e.g., a pdf file, or downloaded as a coded file that can be uploaded to an accounting system.) The computer 102 can present an interface 1100 illustrated in FIG. 11. The interface 1100 displays a link titled "ERA E-mail Notification and Secure FTP (mailbox) Delivery." Users may select the link 1102 to "opt in" to the email notification program. Users are required to supply e-mail address and contact first and last name. Users are given the option of displaying the check amount and or check date on e-mail notifications (some may not wish to have this information sent to their e-mail account) and users must agree to terms of service document. After the user enrolls, the properties of that user are changed in a user database to reflect a yes status for e-mail notification. When the payer 835 file is processed, the system 102 (FIG. 1) builds and stores e-mails associated with the 835 information, a specific user and email address. All e-mails include: the payer name, the payer phone number, the check number (only the last four digits are "in the clear" for security reasons) and the provider name. If the user "opts in, "the e-mail also displays the check amount and check date. After the payer 835 is completely parsed, the e-mail server begins to send the stored e-mails to the users.

Without some type of notification, providers may notice payments in their bank accounts related to Electronic Funds Transfer (EFT) and not know if the ERA that explains the payment is available. Providers want to know if an ERA is available without logging into a system to check. Furthermore, providers may only need certain payment information relating to an ERA and not the full ERA. The exemplary system described herein notifies and informs the provider about ERA information is via an automated email system keyed to the parsing of an 835 file.

Figure 14:
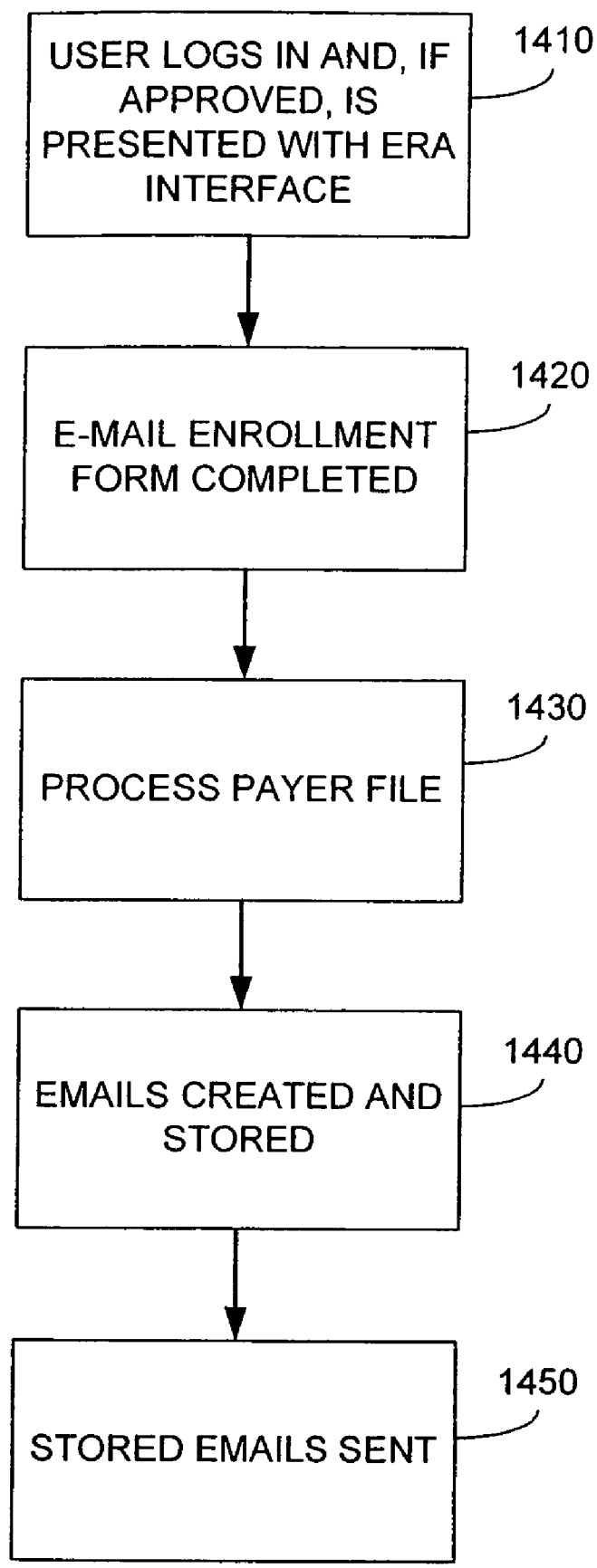
FIG. 14 is a flow diagram of operations performed in an ERA notification process in accordance with an exemplary embodiment.

FIG. 12 illustrates an ERA display 1200 containing provider and payer information and claim, service, and adjustment information. FIG. 13 illustrates a sample ERA notification e-mail. FIG. 14 illustrates operations performed by the computer 102 in the e-mail notification method. In an operation 1410, the computer 102 processes log in data and, if approved, an ERA web interface is displayed. An ERA e-mail enrollment form data is added to the user properties in the ERA user database in an operation 1420. In an operation 1430, the payer 835 file is processed by the computer 102. As an 835 file is processed, e-mails are created and stored in an operation 1440. After the 835 file is processed, stored e-mails are sent via a mail server in an operation 1450.

There are several advantages to the Electronic EOB® transaction described. By coupling 835 data with an electronic funds transfer, the payer no longer is required to mail a check and a paper EOB statement. As a result, the payer saves money related to the check processing and mailing. Providers benefit from the Electronic EOB® transaction and electronic funds transfer because funds are directly deposited to a bank account, avoiding the possibility of lost or stolen checks. Providers also benefit from the Electronic EOB® transaction if they have a patient accounting system that can upload the 835 data and use this 835 data to reconcile outstanding patient account balances. As a result, there is no need to manually post payments from a paper EOB.

It should be appreciated, of course, that the details associated with the product described herein merely represent one possible implementation. Exemplary embodiments are described herein with reference to drawings. These drawings illustrate certain details of specific embodiments that implement the systems and methods and programs of the exemplary embodiments. However, describing the exemplary embodiments with drawings should not be construed as imposing on the invention any limitations that may be present in the drawings. The present invention contemplates methods, systems and program products on any machine-readable media for accomplishing it operations. The exemplary embodiments may be implemented using an existing computer processor, or by a special purpose computer processor incorporated for this or another purpose or by a hardwired system.

Embodiments may include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EPROM, CD-ROM or other optical disk storage, magnetic disk storage or other magnetic storage devices, or any other medium which can be used to carry or stored desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments are described in the general context of method operations which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods described herein. The particular sequence of such executable instructions or associated data structures represent examples of corresponding acts for implementing the functions described in such operations.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links or by a combination of hardwired and wireless links) through a communications network. In a distributed computing environment, program modules may be located in both local and remote memory storage devices.

It should be noted that although the flow charts provided herein show a specific order of method operations, it is understood that the order of these operations may differ from what is depicted. Also two or more operations may be performed concurrently or with partial concurrence. Such variation will depend on the software and hardware systems chosen and on designer choice. Likewise, software and web implementations of the exemplary embodiment could be accomplished with standard programming techniques with rule based logic and logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of exemplary embodiments have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

The invention claimed is:

1. A healthcare eligibility and benefits data system, the system comprising:
a provider computer configured to:
receive patient information for a patient;
communicate an eligibility request to a payer computer, wherein the eligibility request is based on the received patient information;
receive an eligibility response from the payer computer in response to the eligibility request, wherein the eligibility response includes data associated with the patient in a format that is acceptable to the payer computer;
obtain the data associated with the patient and capture the format for the data associated with the patient from the eligibility response received from the payer computer, wherein the data associated with the patient includes identification data of the patient;
store the data associated with the patient and the format from the eligibility response;
populate a subsequent eligibility request for the patient with the data associated with the patient and format the data associated with the patient according to the format captured from the eligibility response; and
send the subsequent eligibility request to the payer computer.

2. The system of claim 1, wherein the stored data comprises a patient member number and a patient date of birth.

3. The system of claim 1, wherein the eligibility request includes a completed HIPAA 270 form and the eligibility response includes a completed HIPAA 271 form.

4. The system of claim 1, wherein the provider computer is further configured to present a list of patients for whom identification data is stored.

5. The system of claim 4, wherein the provider computer is further configured to present the list of patients in an interface in a pop up window.

6. The system of claim 1, wherein the provider computer is further configured to check format validity locally before the eligibility request is communicated.

7. The system of claim 6, wherein the provider computer is configured to determine the format validity based on stored rules associated with a plurality of payer computers.

8. The system of claim 1, wherein the provider computer is further configured to couple the stored data with a request for electronic funds transfer.

9. The system of claim 1, wherein the provider computer is further configured to use the stored data to reconcile outstanding patient account balances.

10. A non-transitory computer-readable medium having instructions stored thereon that, in response to execution by a computing device, cause the computing device to perform operations comprising:
receiving patient information for a patient;
communicating an eligibility request to a payer computer, wherein the eligibility request is based on the received patient information;
receiving an eligibility response from the payer computer for the patient in response to the eligibility request, wherein the eligibility response includes data associated with the patient in a format that is acceptable to the payer computer;
obtaining the data associated with the patient and capturing the format for the data associated with the patient from the eligibility response received from the payer computer, wherein the data associated with the patient includes identification data of the patient;
storing the data associated with the patient and the format from the eligibility response;
populating a subsequent eligibility request for the patient with the data associated with the patient and formatting the data associated with the patient according to the format captured from the eligibility response; and
send the subsequent eligibility request to the payer computer.

11. The product of claim 10, wherein the stored data comprises a patient member number and a patient date of birth.

12. The product of claim 10, wherein the eligibility request includes a completed HIPAA 270 form and the eligibility response includes a completed HIPAA 271 form.

13. The product of claim 10, wherein the instructions further cause the computing device to present a list of patients for whom identification data is stored.

14. The product of claim 10, wherein the instructions further cause the computing device to couple the stored data with a request for an electronic funds transfer.

15. The product of claim 10, wherein the instructions further cause the computing device to use the stored data to reconcile outstanding patient account balances.

16. A method comprising:

receiving, by a provider computer, patient information for a patient;

communicating, by the provider computer, an eligibility request to a payer computer, wherein the eligibility request is based on the received patient information;

receiving, by the provider computer, an eligibility response from the payer computer for the patient in response to the eligibility request, wherein the eligibility response includes data associated with the patient in a format that is acceptable to the payer computer;

obtaining, by the provider computer, the data associated with the patient and capturing the format for the data associated with the patient from the eligibility response received from the payer computer, wherein the data associated with the patient includes identification data of the patient;

storing the data associated with the patient and the format from the eligibility response using the provider computer;

populating, by the provider computer, a subsequent eligibility request for the patient with the data associated with the patient and formatting the data associated with the patient according to the format captured from the eligibility response; and sending the subsequent eligibility request from the provider computer to the payer computer.

17. The method of claim 16, wherein the stored data comprises a patient member number and a patient date of birth.

18. The method of claim 16, wherein the eligibility request includes a completed HIPAA 270 form and the eligibility response includes a completed HIPAA 271 form.

19. The method of claim 16, further comprising presenting a list of patients for whom identification data is stored using the provider computer.

20. The method of claim 19, wherein said presenting a list of patients for whom identification is stored comprises presenting the list of patients in an interface in a pop up window.

21. The method of claim 16, communicating the eligibility request to the payer computer using the provider computer.

22. The method of claim 21, further comprising checking, using the provider computer, format validity locally before the eligibility request is communicated.

23. The method of claim 22, wherein said checking format validity comprises determining the format validity based on stored rules associated with a plurality of payer computers.

24. The method of claim 16, further comprising coupling the stored data with a request for electronic funds transfer using the provider computer.

25. The method of claim 24, further comprising reconciling, using the provider computer, outstanding patient account balances based on the stored data.

* * * * *